(No Model.) 2 Sheets—Sheet 1.

C. W. WINSTON & F. THROOP.
ORCHARD PLOW.

No. 491,033. Patented Jan. 31, 1893.

Witnesses:
M. M. Gee.
F. M. Townsend.

Inventors:
Charles W. Winston
Frank Throop
Hazard & Townsend
Their Att'ys

THE NORRIS PETERS CO., PHOTO-LITHO., WASHINGTON, D. C.

(No Model.) 2 Sheets—Sheet 2.
C. W. WINSTON & F. THROOP.
ORCHARD PLOW.
No. 491,033. Patented Jan. 31, 1893.
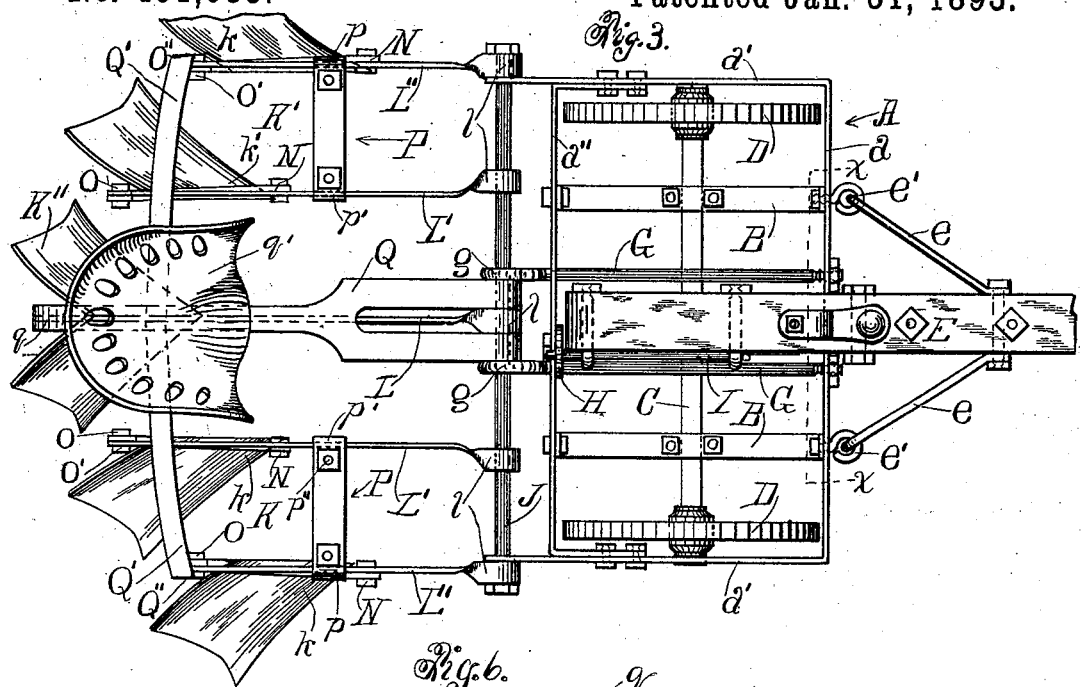
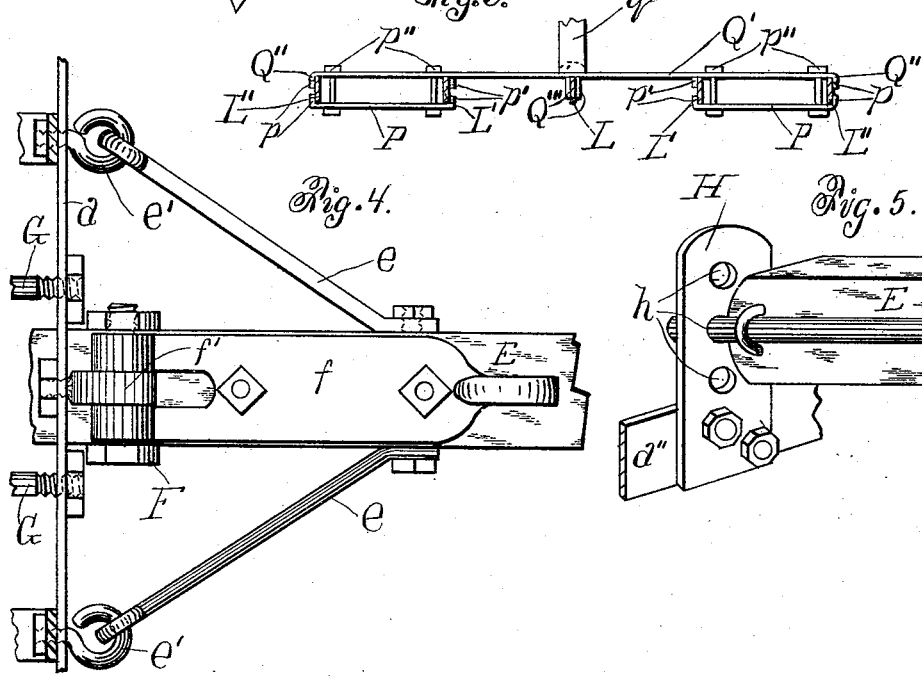
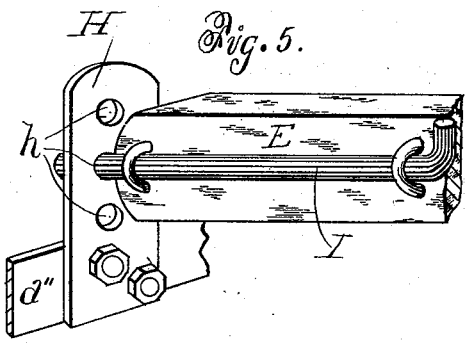
Witnesses.
Inventors.
Charles W Winston
Frank Throop
Hazard & Townsend
Their Attys.

UNITED STATES PATENT OFFICE.

CHARLES W. WINSTON AND FRANK THROOP, OF SAN GABRIEL, CALIFORNIA; SAID THROOP ASSIGNOR TO SAID WINSTON AND EMMO C. BICHOWSKY, OF SAME PLACE.

ORCHARD-PLOW.

SPECIFICATION forming part of Letters Patent No. 491,033, dated January 31, 1893.

Application filed August 11, 1892. Serial No. 442,786. (No model.)

*To all whom it may concern:*

Be it known that we, CHARLES W. WINSTON and FRANK THROOP, citizens of the United States, residing at San Gabriel, in the county of Los Angeles and State of California, have invented a new and useful Improvement in Orchard and Vineyard Plows, of which the following is a specification.

One object of our invention is to produce a gang plow suitable to be used in orchards and vineyards, and which may be quickly and accurately regulated to turn the ground to any depth desired.

A further object of our invention is to so arrange and construct the plow that it may be quickly changed to either leave a dead furrow in the center or to throw the ground from both sides in toward the center to fill up the dead-furrow as may be desired.

Our invention broadly stated comprises the combination of a suitable draft or truck frame supported upon two suitably journaled ground wheels; a tongue pivotally attached to the frame and arranged to allow horizontal adjustment of the frame with relation to the tongue, and a series of plows having the front ends of their beams pivotally attached to the rear end of the frame.

Our invention also comprises various other features and combinations hereinafter fully set forth.

The accompanying drawings illustrate our invention.

Figure 1:
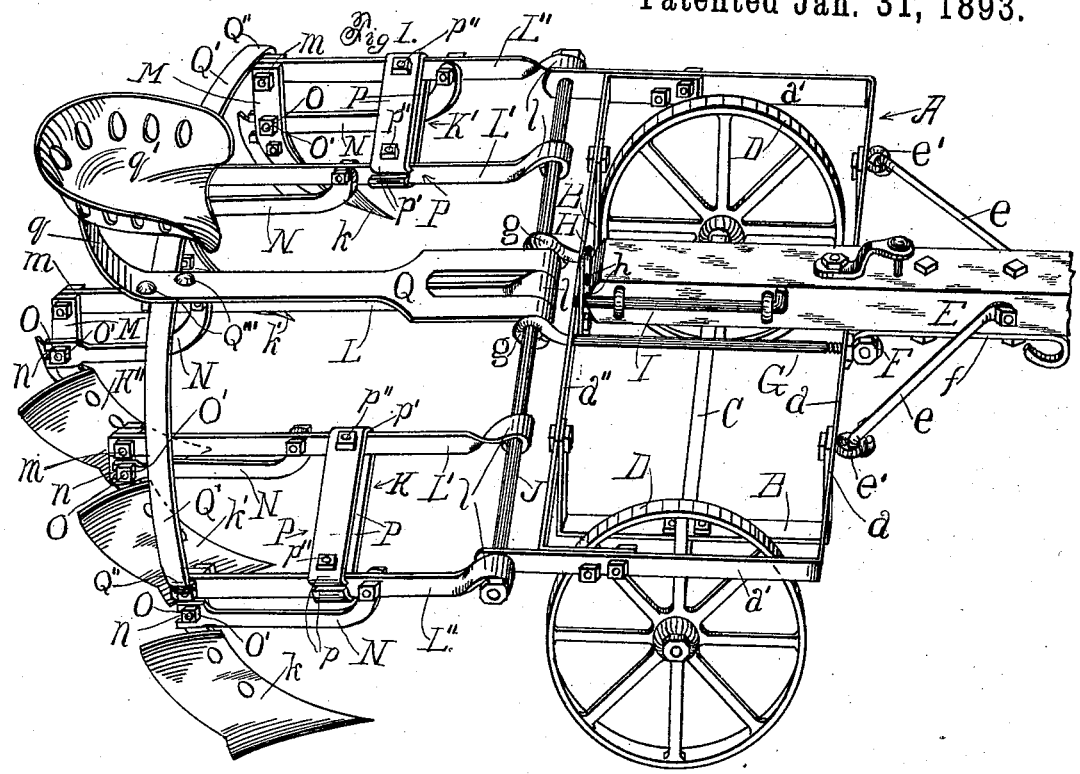
Figure 2:
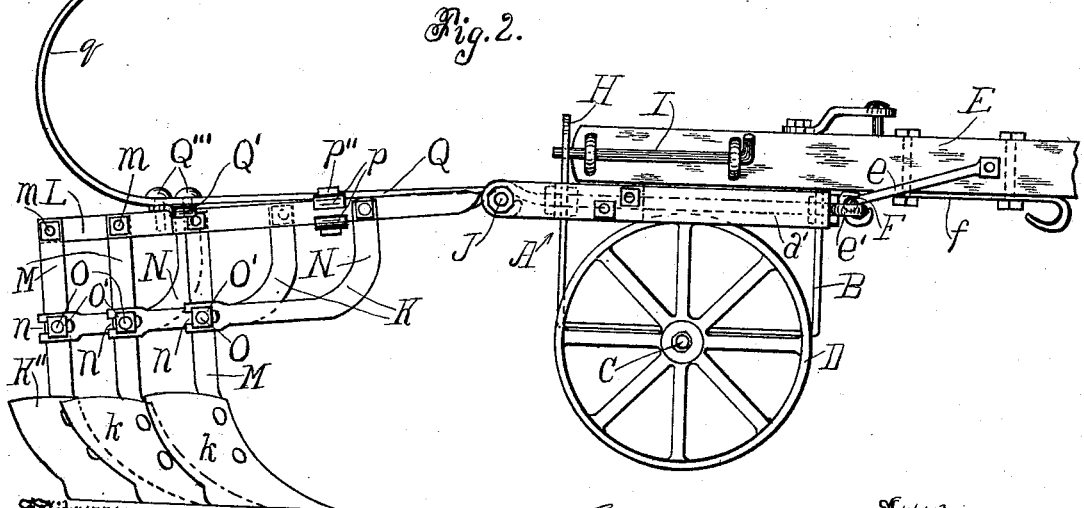

Figure 1 is a perspective view of a device embodying our invention, and arranged to leave a dead furrow in the center. Fig. 2 is a side elevation of the same. Fig. 3 is a plan view of the same. Fig. 4 is a bottom view of a fragment of the frame and the tongue showing the manner of pivoting the tongue to the frame. Line $x—x$ Fig. 3 indicates the line on which the parts are broken away. Fig. 5 is a perspective view of a fragment of the tongue and the frame illustrating the frame shifting device. Fig. 6 is a rear elevation of the seat support and plow brace in position upon the plow beams some of which are shown in cross section.

The wheel supported truck or rocking draft frame A comprises the combination of the front transverse beam $a$ having the rearwardly extending side draft arms $a'$; the transverse rear beam $a''$ having its ends secured to the side draft arms at a point in front of their rear ends; two axle brackets B secured to the front and rear beams $a$ $a''$ and extending across there-between. To these brackets and substantially midway between the beams $a$ $a''$ is secured the axle C upon which are journaled the supporting or ground wheels D.

The tongue E is pivoted to the front transverse beam $a$ by a suitable hinge joint F having one member $f$ attached to the tongue and the other member $f'$ attached to the beam $a$. The tongue is stayed laterally by the braces $e$ $e$ which are bolted to the tongue at one end and have their other ends hooked through eyebolts $e'$ $e'$ which are attached to the beam $a$.

To the rear beam $a''$ is attached a frame adjusting standard H which is vertically arranged and is provided with suitable perforations $h$ adapted to receive a bolt I which is secured upon the tongue E and arranged for axial movement to allow the bolt to be shot into and withdrawn from the perforations to secure the frame against vertical movement, or to allow vertical adjustment of the frame with relation to the tongue.

G G are draft rods passing through the rear beam $a''$ and secured at their front ends to the front beam $a$. The rear ends of the draft rods project beyond the beam $a''$ and are provided with eyes $g$ adapted to receive a pivot draft bolt or shaft J which extends from side to side of the frame and passes through suitable perforations in the rearwardly projecting ends of the side draft arms $a'$.

The plows are arranged in two gangs K and K', the gang K turning the soil toward the right and the gang K' turning the soil toward the left. When arranged to throw the soil from the center as illustrated in the drawings an additional right and left hand plow K'' is placed in the center between the two gangs K and K' in order to open the dead furrow. We prefer to make the plow beams L L' &c.

of metal as illustrated and provide the front end of each beam with an eye $l$ adapted to receive the pivot bolt J.

The plow gangs are each composed of two plows $k$ $k$, $k'$ $k'$ each secured to a plow standard M. The plow standards are each secured to their respective plow beams L L' &c. by a single bolt $m$. Braces N are respectively secured to the beams L L' &c. in front of the standards and each are provided at their rear ends with a rearwardly opening slot $n$ arranged to receive a clamp bolt O which passes through such plow standard and is secured by a nut O'. The two beams of each gang are secured to each other by the clamp braces P which comprise the two members P P each struck up at their extreme ends forming the beam engaging ears or lugs P'. The two members are oppositely arranged above and below the plow beams and are secured by the clamp bolts P''.

The seat frame Q is pivoted to the truck or main frame by the pivot bolt J and extends toward the rear and is bowed upward to form a suitable seat bow $q$ to which is secured the seat $q'$. The seat frame is provided with a laterally extending brace Q' arranged to rest upon the plow beams to assist in supporting the seat, and also to place the weight of the driver upon the plows to hold them in the ground, and to prevent any jumping of the plows. This frame also serves to hold the plow gangs K K' from spreading outwardly, the ends of the arms Q' being provided with downwardly extending lugs Q'' arranged to engage the plow beams to prevent outward movement of the plows. The center of the brace is also provided with lugs or pins Q''' arranged to engage the beam of the center plow to hold it in position.

In practice in plowing vineyards the plows are made of sufficient width to plow all the land between two rows of vines. If the ground is level, the first time the ground is plowed, the plow gangs are arranged to throw the dirt toward the center and away from the vines, and the second time the gangs are changed to throw dirt toward the vines and away from the center. This can be quickly done by removing the pivot bolt J, thus releasing the gangs from the frame, and then transposing the gangs from one side to the other. When the soil is thrown away from the vines the center plow K'' is omitted, and a ridge is left in the center. When the operation is reversed the plow K'' is attached and the ridge left by the previous plowing is thrown to each side and a dead furrow is left in the center. When used for orchard plowing the plow may be used either way, or an extra right or left gang of plows may be attached in place of the reverse gang and thus throw the dirt all in one direction.

The depth to which the plows will cut can be quickly varied by shifting the frame A by removing the bolt I from its engagement with the standard H, and elevating or depressing the rear end of the frame to elevate or depress the plow beams to cause the plows to cut deeper or shallower as may be desired. When adjusted to suit, the bolt I is shot into one of the holes $h$ to hold the frame in the desired position. The truck or frame being supported near its midlength by the wheels D the frame can easily be changed by rocking the frame upon the axle support.

If one of the plows should strike a root or other obstruction, the notch $n$ in the brace N will let the bolt O pull out and the plow swing backward until it slips off of the obstruction. When this occurs, the driver can quickly place it back in position and tighten the clamp bolt so that it will clamp the plow post firmly enough to hold the plow in position until another obstruction is encountered. In plowing with four horses as this plow is designed to be operated, this is an important point because if the post and beam are firmly secured to each other in the usual way, if an obstruction is engaged, the plow is usually wrenched to pieces before the team can be stopped.

This plow is also especially adapted to pass through the vineyard without breaking and tearing the vines, the frame A being so wide that the ends of the single trees do not project beyond the side of the frame, and the frame merely pushes the shoots to one side without catching them as the hooks upon the singletrees usually do, and the wheels and the ends of the axle are also inside of the frame.

Now having described our invention, what we claim as new and desire to secure by Letters Patent, is;—

1. The improved orchard and vineyard plow set forth comprising the combination of the axle; the ground-wheels journaled thereupon; the rocking draft frame comprising the combination of the front transverse beam having rear-wardly extending side draft arms and the transverse rear beam having its ends secured to the side draft arms and the two axle brackets secured to the front and rear beam and extending across therebetween and secured to the axle substantially mid-way between the front and rear beams; the tongue pivoted to the front transverse beam and secured to the rear of such frame by means which allow the vertical adjustment of the rear end of the tongue and the rear of the frame with relation to each other, and the plows pivotally attached to the rear of the frame.

2. The improved plow set forth comprising the combination of the axle; the ground wheels journaled thereon; the rocking draft frame mounted upon such axle; the tongue pivoted to the front of such draft frame and adjustably connected with the rear of such frame; the pivot bolt extending across from side to side at the rear of such rocking frame; the plows pivoted to the rear of the rocking frame by such pivot bolt, and means for adjustably connecting the rear end of the tongue with the rear end of the rocking frame.

3. The combination of the wheel-supported rocking draft frame; the tongue pivoted to the front of such frame and adjustably secured to the rear of such frame; the plows having their beams pivoted to the rear of such frame; the seat frame pivoted to the rear of the draft frame and extending toward the rear and provided with the laterally extending brace arranged to rest upon the plow beams and provided with suitable lugs or pins arranged to engage the plow beams to hold them in place against lateral displacement.

4. In an orchard and vineyard plow, the combination of the wheel supported truck; a tongue hinged to the front of such truck; a vertically arranged frame adjusting standard secured to the rear of such truck and provided with suitable perforations; a bolt secured upon the tongue and arranged for axial movement to allow the bolt to be shot into and be withdrawn from the perforations in the frame adjusting standard, and the plows having their beams pivotally secured to the rear of the truck substantially as and for the purpose set forth.

5. In an orchard and vineyard plow, the combination of a frame comprising a front transverse beam, two rearwardly extending side draft arms, a rear transverse beam secured to such side draft arms in front of their rear ends, and the axle brackets secured to the front and rear beams and extending across there-between; an axle secured to such axle brackets; two supporting wheels journaled upon such axle; a tongue hinged to the front transverse beam by a suitable hinge joint; the lateral braces bolted to the tongue at one end and having their other ends hooked through eye-bolts attached to the front transverse beam; suitable means for adjusting the frame horizontally with relation to the tongue, and a series of plows having their beams pivotally attached to the rear of the frame.

6. The improved plow set forth comprising the combination of the axle; the ground wheels journaled thereon; the rocking draft frame mounted upon such axle; the tongue pivoted to the front of such draft frame and adjustably connected with the rear of such frame; the plows pivoted to the rear of the rocking frame, and means for adjustably connecting the rear end of the tongue with the rear end of the rocking frame.

Dated June 15, 1892.

CHARLES W. WINSTON.
FRANK THROOP.

Witnesses:
JAMES R. TOWNSEND,
ALFRED I. TOWNSEND.